(12) United States Patent
Salmi et al.

(10) Patent No.: US 11,580,010 B2
(45) Date of Patent: Feb. 14, 2023

(54) BIG DATA APPLICATION LIFECYCLE MANAGEMENT

(71) Applicant: PAYPAL, INC., San Jose, CA (US)

(72) Inventors: Meisam Fathi Salmi, San Jose, CA (US); Prabhu Kasinathan, San Jose, CA (US); Romit Mehta, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 17/480,506

(22) Filed: Sep. 21, 2021

(65) Prior Publication Data

US 2022/0004483 A1 Jan. 6, 2022

Related U.S. Application Data

(63) Continuation of application No. 16/440,827, filed on Jun. 13, 2019, now Pat. No. 11,126,540.

(51) Int. Cl.
*G06F 11/36* (2006.01)
*G06F 9/455* (2018.01)
(Continued)

(52) U.S. Cl.
CPC .......... *G06F 11/3664* (2013.01); *G06F 8/433* (2013.01); *G06F 8/71* (2013.01); *G06F 9/3891* (2013.01); *G06F 9/45558* (2013.01); *G06F 2009/4557* (2013.01); *G06F 2009/45562* (2013.01)

(58) Field of Classification Search
CPC ....................................................... G06F 11/36
See application file for complete search history.

(56) References Cited

U.S. PATENT DOCUMENTS 6,571,389 B1 5/2003 Spyker et al.
8,560,851 B1 10/2013 Cherukumudi et al.
(Continued)

OTHER PUBLICATIONS

Barbier F., et al., "Practical DevOps for Big Data", Retrieved on Aug. 4, 2020, Retrieved from Internet URL: http://wp.doc.ic.ac.uk/dice-h2020/wp-content/uploads/sites/75/2018/03/D7.4_Software-engineering-book-Appendix.pdf, Jan. 30, 2018, 60 pages.
(Continued)

*Primary Examiner* — Jae U Jeon
(74) *Attorney, Agent, or Firm* — Haynes and Boone, LLP (57) ABSTRACT

Aspects of the present disclosure involve systems, methods, devices, and the like for creating an application lifecycle management platform for big data applications. In one embodiment the lifecycle management platform can include a multiple-layer container file that integrates multiple big-data tools/platforms. The system may create a generic template application, create a build environment for the generic template application, create a test environment for the generic template application, and run the built generic template application in the test environment prior to the user writing any new code in the generic template application. In one embodiment, the test environment includes a container management system or virtual machine that launches the big data application (which may be the generic template application before a developer edits the file) on a separate big-data server cluster.

20 Claims, 6 Drawing Sheets

(51) Int. Cl.
*G06F 9/38* (2018.01)
*G06F 8/41* (2018.01)
*G06F 8/71* (2018.01)

(56) References Cited

U.S. PATENT DOCUMENTS

| | | |
|---|---|---|
| 8,990,817 B1 | 3/2015 | Garai et al. |
| 9,122,562 B1 | 9/2015 | Stickle |
| 9,182,951 B1 | 11/2015 | Ormerod et al. |
| 9,235,409 B1 | 1/2016 | Guo et al. |
| 10,248,449 B1 | 4/2019 | Emelyanov et al. |
| 10,482,239 B1 | 11/2019 | Liu et al. |
| 2005/0193269 A1 | 9/2005 | Haswell et al. |
| 2010/0015926 A1 | 1/2010 | Luff |
| 2012/0005255 A1* | 1/2012 | Cherukuri ............ G06Q 10/10 709/203 |
| 2013/0185402 A1* | 7/2013 | Ayanam ............ H04L 41/0813 709/221 |
| 2013/0212601 A1* | 8/2013 | Dharmapurikar ....... G06F 9/545 719/320 |
| 2014/0157243 A1 | 6/2014 | Vargas |
| 2014/0201179 A1 | 7/2014 | Chang et al. |
| 2016/0011925 A1 | 1/2016 | Kulkarni et al. |
| 2016/0219019 A1* | 7/2016 | Mathur ................. G06F 21/606 |
| 2017/0083175 A1 | 3/2017 | Layman et al. |
| 2017/0322934 A1* | 11/2017 | Chen ....................... G06F 9/50 |
| 2018/0060460 A1 | 3/2018 | Zhang et al. |
| 2018/0121236 A1 | 5/2018 | Odenheimer et al. |
| 2018/0139238 A1 | 5/2018 | Schultz et al. |
| 2018/0349254 A1 | 12/2018 | Hui |
| 2018/0365133 A1 | 12/2018 | Mitchell et al. |
| 2018/0373525 A1 | 12/2018 | Kaluza et al. |
| 2019/0347121 A1* | 11/2019 | Luo ......................... G06F 9/542 |

OTHER PUBLICATIONS

Bluebeam., "A Guide to Implementing Bluebeam Within Your Enterprise", Retrieved on Aug. 4, 2020, Retrieved from Internet URL: https://support.bluebeam.com/wp-content/uploads/2015/11/2015-5_bluebeam-enterprise-solutions.pdf, Nov. 30, 2015, 13 pages.
International Search Report and Written Opinion for International Appl. No. PCT/US2020/037018, dated Sep. 30, 2020, 20 pages.
Xu T., et al., "Mining Container Image Repositories for Software Configuration and Beyond", Retrieved on Aug. 4, 2020, Retrieved from Internet URL: https://arxiv.org/pdf/1802.03558 pdf, Feb. 13, 2018, 6 pages.

* cited by examiner

BIG DATA APPLICATION LIFECYCLE MANAGEMENT

CROSS REFERENCE TO RELATED APPLICATIONS

The application is a continuation of U.S. patent application Ser. No. 16/440,827, filed on Jun. 13, 2019, and issued as U.S. Pat. No. 11,126,540 on Sep. 21, 2021, which is incorporated by reference in its entirety.

TECHNICAL FIELD

The present disclosure generally relates to big-data application development and more specifically, to big-data application lifecycle management.

BACKGROUND

Application lifecycle management is a technique to control an application from the idea phase through development, deployment, upgrade, and removal from service. Tools for managing the lifecycle of applications are able to deploy, troubleshoot, manage governance, and test applications in a structured way.

Terabytes, petabytes, and exabytes of data are generated daily by digital devices and services. Big data is a field that analyzes vast data sets too large for traditional software. Data may include archived documents, documents and websites, media files (images, videos, audio files), data storage systems (repositories, databases, file systems), business applications, public and governmental data sources, social media activity, machine log data, and sensor data (from media devices, internet-of-things devices, appliances, farm equipment, vehicle sensors). This data may be analyzed or mined to perform prediction, analysis, modeling, and training for artificial intelligence. Monitoring and analyzing the data, however, may be a challenge due to the volume, quality, veracity, speed of data received as well as the use of numerous systems and applications to complete.

Because of the hardware and software requirements placed upon systems running and storing big data applications tools for managing the lifecycle of non-big-data applications cannot work for big-data applications. Thus, there is a need for tools to manage the lifecycle of these applications including creating, building, testing, deploying, and maintaining big-data applications.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Aspects of the present disclosure involve systems, methods, devices, and the like for creating an application lifecycle management platform for big data applications. A big-data application includes an application where the data cannot fit on a single computer/server or when a single computer cannot process a single transaction. The process to manage lifecycles of big-data applications, which includes creating, building, testing, deploying, analyzing, and maintaining big-data applications. In certain systems, lifecycle management has many steps, many of which are manual, and needs direct contact and communication with many teams/platforms and services.

Features to manage application life cycles are built on top of multiple development and management platforms. These platforms may include, for example, an orchestration platform for code development, building, deployment, and monitoring. Platforms may also include a container management platform, APACHE MESOS, GITHUB, JENKINS, TWISTLOCK, Assembler that creates lower-level code from higher-level languages, the HADOOP Ecosystem, the Kerberos security-focused network authentication protocol, LIVY and other related RESTful interfaces to submit and manage APACHE SPARK jobs on server clusters, a credential and secret management platform used to store encrypted keys and passwords such that they do not need to be stored on the disk, and the GIMEL unified API to access data stored on any data store and platform to write SQL to access data on any data store.

According to the present embodiments, these services may be modified and improved to accommodate big-data applications. In one embodiment, a multiple-layer container file (e.g. a DOCKER image) may be created that integrates with the above tools/platforms. Each layer may add capabilities to work with one or more of the described platforms. The multiple-layer container may allow multiple platform teams to create generic components that each platform team can build for their developers which may then be layered on top of base code. This may allow for increased code reusability and standardization between development teams in a single organization. In one embodiment, a four-layer container is described. The first layer describes a base layer containing tools, platforms, and configurations for a runtime environment, networking and security. The first layer may also include other core software and core libraries such as python, curl, clib, among many other libraries and software. In some examples, the first layer includes an operating system. This operating system may be a customized operating system to be used by programmers and to run applications. For example, the operating system may include software and libraries for creating and building programs. The second layer describes a big-data layer which contains features to access a big-data framework (e.g., the APACHE HADOOP Ecosystem including APACHE PIG, APACHE HIVE, APACHE HBASE, APACHE PHOENIX, APACHESPARK,APACHEZOOKEEPER,CLOUD-ERAIMPALA,APACHE FLUME, APACHE SQOOP, APACHE OOZIE, and APACHE STORM) and upload the application dependencies to a distributed file-system (e.g., the HADOOP Distributed File System (HDFS)). The third layer describes a platform/team layer including features required by each specific platform or team, such as templates for runtime parameters and dependencies. The fourth layer describes an application layer which contains features used or required by the application such as application specific dependencies.

In embodiments of the present disclosure, a user may instruct the system to create a new big-data application for development. A user may be a single developer, or a team of developers, or an organization or sub-organization of developers. The system may create a generic template application (in some embodiments the generic application is developer-group or team specific), create a build environment for the generic template application, create a test environment for the generic template application and run the built generic template application in the test environment prior to the user writing any new code in the generic template application. An advantage of the present embodiments may enable developers/development teams to focus on their specific application's code and not have to worry about environments, infrastructure complexity, connectivity, etc. This problem is more difficult in the big data world because of the number of components, infrastructure complexity and connectivity compared to a traditional relational database management system (RDBMS)-based application world. In one embodiment, the test environment includes a virtual machine/container application that launches the big data application (which may be the generic template application before a developer edits the file) on a separate big-data server cluster. In certain environments, it may be difficult to create a test or stage environment for data applications, especially big-data applications, because of the various dependencies which need to be part of that environment and because the APis and interactions may be finicky when even minor versions differ. Embodiments of the present disclosure alleviate this by testing the generic components in build and test environments before testing application code providing a simplified debugging process. In some examples, the virtual machine/container application is launched on a cluster management system and the big-data application runs on a big-data cluster. After the generic template application is built and tested, the user or group of users may update the generic template application with application specific code in a code repository. Updating/saving the application in the code repository or updating a master branch or version of the big-data application may trigger the build environment to rebuild the big-data application. The test environment may then automatically run the new version of the big-data application.

An automated tool for big-data application lifecycle management may improve the experience of developers creating and managing applications and improve operations to view and control running applications. The automated big-data application lifecycle management system may minimize the amount of manual data entry in setting up and building big-data applications, create a standardized environment with which to create and test big-data applications, and allow for multiple big-data applications to be scheduled, tested, and managed that allows for integration with third party (open source and proprietary) tools and platforms. The big-data application lifecycle management platform, among other things, may also scan the application for vulnerabilities, enforced coding standards, and provide monitoring and alerting.

Figure 1:
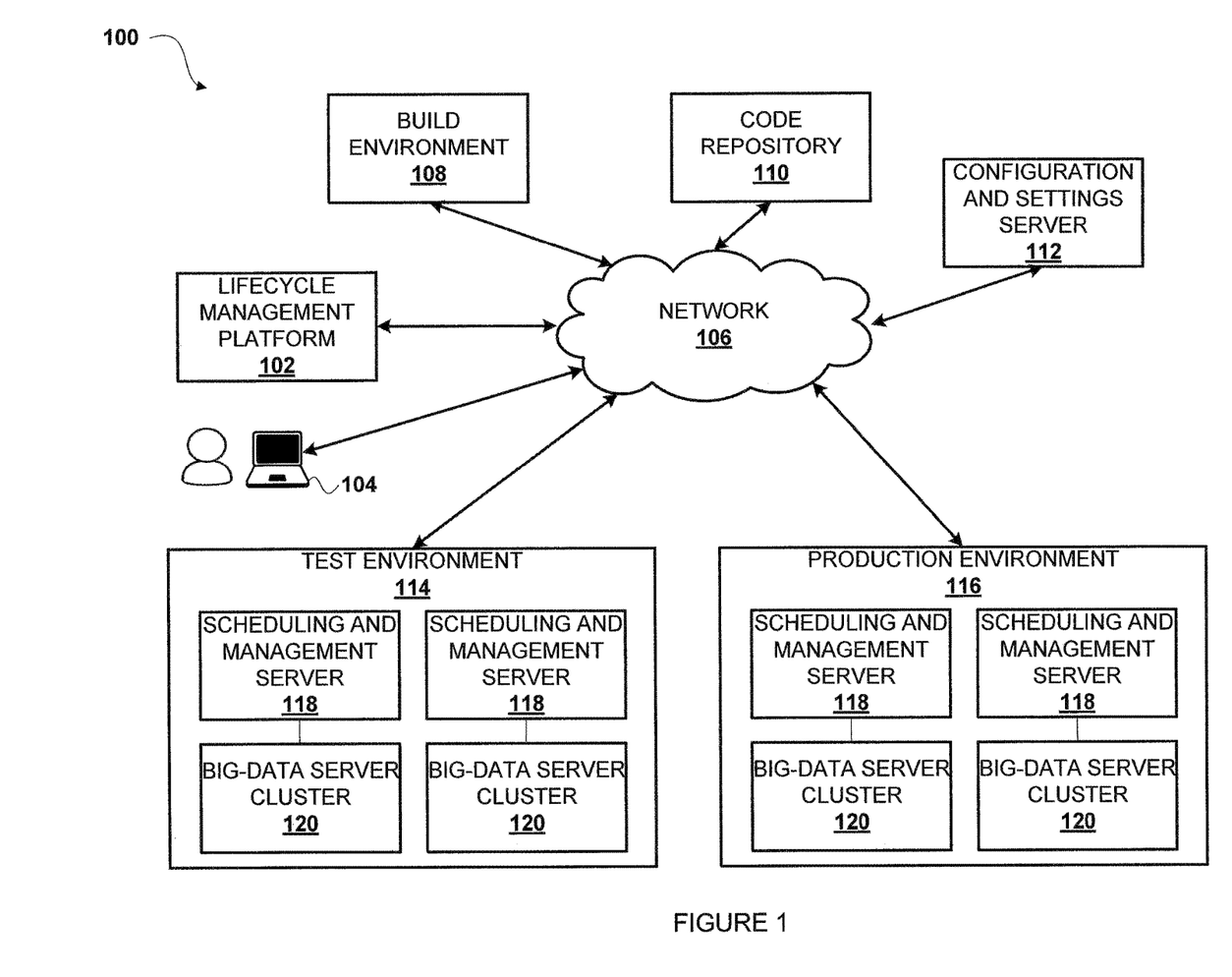
FIG. 1 illustrates a block diagram illustrating a big-data application lifecycle management system according to one embodiment.

Therefore, in one embodiment, a system 100 for performing application lifecycle management configured to manage the lifecycle of big-data applications is introduced. FIG. 1 presents a system 100 for performing lifecycle management of big-data applications. A lifecycle management platform 102 may include an interface for a user device 104 to connect to directly or via a network 106. System 100 may also include a build environment 108, a code repository 110, and a configuration and settings server 112. System 100 may include a test environment 114 and a production environment 116. Each of test environment 114 and production environment 116 may include one or more scheduling and management servers 118 and big-data server clusters 120.

User device 104 may be implemented using any appropriate combination of hardware and/or software configured for wired and/or wireless communication over network 106. For example, in one embodiment, user device 104 may include a personal computer device. The personal computer may include desktop computing systems, laptop/notebook computing systems, tablet computing systems, mobile phones, Application Specific Integrated Circuit (ASIC) computing systems, an interne of things (IoT) device, and/or other computing device known in the art. The personal computer may include software (e.g., applications or a browser interface) to perform or connect to devices that may be configured to perform big-data\application lifecycle management e.g., the lifecycle management platform 102.

User device 104 may include one or more applications, e.g., browser applications which may be used, for example, to provide an interface to permit the user to browse information available over the network 106. For example, in one embodiment, the application may be a web browser configured to view information available over the Internet.

Lifecycle management platform 102 is configured to manage the lifecycle of big-data applications. Lifecycle management platform 102 may be configured to interact with user device 104. For example, lifecycle management platform 102 may present an interface to setup a new big-data application, to check the current status of a big-data application including whether the application is new, has been built, has been tested in a test environment (e.g. test environment 114), or is running in a production environment (e.g., production environment 116). Further, lifecycle management platform 102 may provide an interface to view logs and monitor settings and resource use of server clusters, governance, access control, and any errors or alerts. Lifecycle management platform 102 may connect with code repository 110 to store and manage code.

Further, lifecycle management platform 102 may provide that data analytics and integration that enable users to register their big data applications and deploy on production. Lifecycle management platform 102 enables the ability to view available datasets, view schema, and view system and object attributes. Lifecycle management platform 102 may auto discover datasets across all data stores. Lifecycle management platform 102 may provide a dashboard and alerts which may include operational metrics including statistics, refresh times and trends, visibility on approvals and audits as well as administrative alerts (e.g., capacity issues, data access violations, and data classification violations) and user alerts (e.g., refresh delays, and profile anomalies). Further, the lifecycle management platform 102 can include a query and integration feature designed for the integration of notebooks and tools. To provide such features, lifecycle management platform 102 may provide categorization, classification, analysis, and mechanisms for running and storing the big data.

Lifecycle management platform 102 can be a platform designed to provide a unified user experience for any computer engine. That is to say, lifecycle management platform 102 can be an analytics platform or framework which enables a user to run one or more big data applications. For example, lifecycle management platform 102 can enable a user to run big data applications/data processing frameworks including but not limited to SPARK, HIVE, PRESTO, etc. The big data applications can be run through a software architectural style or other interface protocol-based application programming interface (API). For example, the API can include but is not limited to representational state transfer (REST) based API, Thrift based API, and simple object access protocol (SOAP) based API. Additionally, lifecycle management platform 102 may be designed to run without installation, setup, and/or configuration. Lifecycle management platform 102 may therefore be used to provide a complete set of tools and technologies for application development, execution, logging, monitoring, alerting, security, workload management, performance tuning, etc. Further, lifecycle management platform 102 may be used to support general compute engines (e.g., SPARK) for large-scale data processing and for running interactive code(s), scheduling jobs, and for machine learning analysis. For example, interactive SPARK may be used with interactive shells, JUPYTER Notebooks, APACHE ZEPPELIN, and Squirrel/DB VISUALIZER SQL clients. As an example of scheduled jobs, lifecycle management platform 102 may be used to schedule jobs with low latency applications, batch heavy applications, and streaming applications in coordination with one or more scheduling and management servers 118. Benefits of lifecycle management platform 102 include and not limited to improvements in administration (e.g., less maintenance, deployment of software stack, and ability to administer system configurations at one place), operations/Security (e.g., through single job execution, coding standards, logging, monitoring and alerting, auditing, and complete statement level history and metrics), development (e.g., through application modularity, ease of restorability, decreased latency, cache sharing, etc.), and analytics (e.g., for direct SQL execution, multi-user support notebooks ability, user friendly interactive applications, and authentication integration).

Lifecycle management platform 102 that can provide a unified access API for any data storage. In particular, lifecycle management platform 102 can provide scalable platform services. Such scalable data services can include data integration. For example, lifecycle management platform 102 can facilitate the orchestration of the acquisition and transformation of data and provide a reliable and secure delivery means of the data to various destinations via streaming or batch. The core data platform can also be used as an analytics data processing platform for accessing the data located in big-data applications (e.g., HADOOP) and data and analytics platform. In addition, lifecycle management platform 102 can also provide access to data storage for self-service lifecycle management of a singular and clustered data stores and management of commodity-based storage. Additionally, lifecycle management platform 102 can be used for learning, optimizing, building, deploying and running various applications and changes. For example, the data application lifecycle on lifecycle management platform 102 can include onboarding big-data applications and managing compute engine changes, compute version changes, storage API changes, storage connector upgrades, storage host migrations, and storages changes.

Build environment 108 may be configured to convert source code files into standalone software programs (artifacts, binaries, executables) or files ready to be interpreted that can be run on a computer/server cluster. Build environment 108 may be configured to collect dependent software code and included libraries for use in building the big-data application. Build environment 108 may be a standalone server or use shared resources. Build environment 108 may use automated tools to trigger builds and scheduling regular builds, or building an application based on a trigger, e.g., a commit in code repository 110. In one example, build environment 108 may use continuous delivery development tools such as JENKINS.

Code repository 110 may be configured to provide storage and development tools for a big-data application. Code repository 110 may provide collaboration tools, version control, issue tracking, and documentation, for a developer. Code repository 110 may be integrated directly into lifecycle management platform 102 or may be a third-party server/application (e.g., GITHUB using a version control system such as GIT) that can connect to lifecycle management platform 102 via a network.

Configuration and settings server 112 may contain and manage configurations and settings for various server environments such as test environment 114 and production environment 116. Lifecycle management platform 102 may connect to configuration and settings server 112 and retrieve settings and configuration files and templates for development of a big-data application. Settings may include the address of a resource manager and addresses of where data is stored.

Test environment 114 and production environment 116 are two separated server environments. Test environment 114 and production environment 116 may have the same or similar settings, however, the data used in test environment 114 uses test data and is not configured to be accessed by end users while data used in production environment 116 is a live data and production environment 116 will run the application for an end user processing operational data. Test environment 114 and production environment 116 may include one or more scheduling and management servers 118. Each of scheduling and management servers 118 may be associated with a big-data server cluster 120. In another embodiment, scheduling and management servers 118 may be associated with multiple big-data server clusters 120.

Scheduling and management servers 118 may be configured to manage the big-data application on a big-data server cluster 120. In some examples, a virtual machine or container application is created on scheduling and management servers 118 to launch a big-data application on big-data server cluster 120. Scheduling and management servers 118 may provide scheduling of server resources between multiple applications (or multiple versions of the same application) running on a big-data server cluster 120. Scheduling and management servers 118 may trigger a big-data application to be run after another application completes or fails or when there is new data available for processing. Scheduling and management servers 118 may also trigger a big-data application under other circumstances. As an example, the scheduling and management servers 118 may trigger a second application as soon as a first application starts regardless of the first application's ultimate success or failure. As another example, the scheduling and management servers 118 may trigger application the second application 30 minutes after application B starts. As another example, the second application may get triggered if the first application fails a number of times consecutively (e.g., the first application fails three times). Scheduling and management servers 118 may trigger a big-data application to run after a particular period of time (daily, hourly, etc.). Big-data applications may be throttled by the scheduling and management servers 118 to spread out when applications begin. Resource usage metrics and statistics may be collected by scheduling and management servers 118. Recommendations may be provided to lifecycle management platform 102 on when to run the big-data application. Other analysis performed by scheduling and management servers including timing of running the big-data application (and running the application in relation to other applications), predictions, risk assessments, resource utilization, and more.

Big-data server clusters 120 may include a group of servers working together to run one or more applications. Big-data server clusters 120 may include a scalable big-data storage (e.g. HDFS) storage pool on a plurality of commodity computer systems. In some embodiments, specialized hardware for big-data applications is used.

Figure 2:
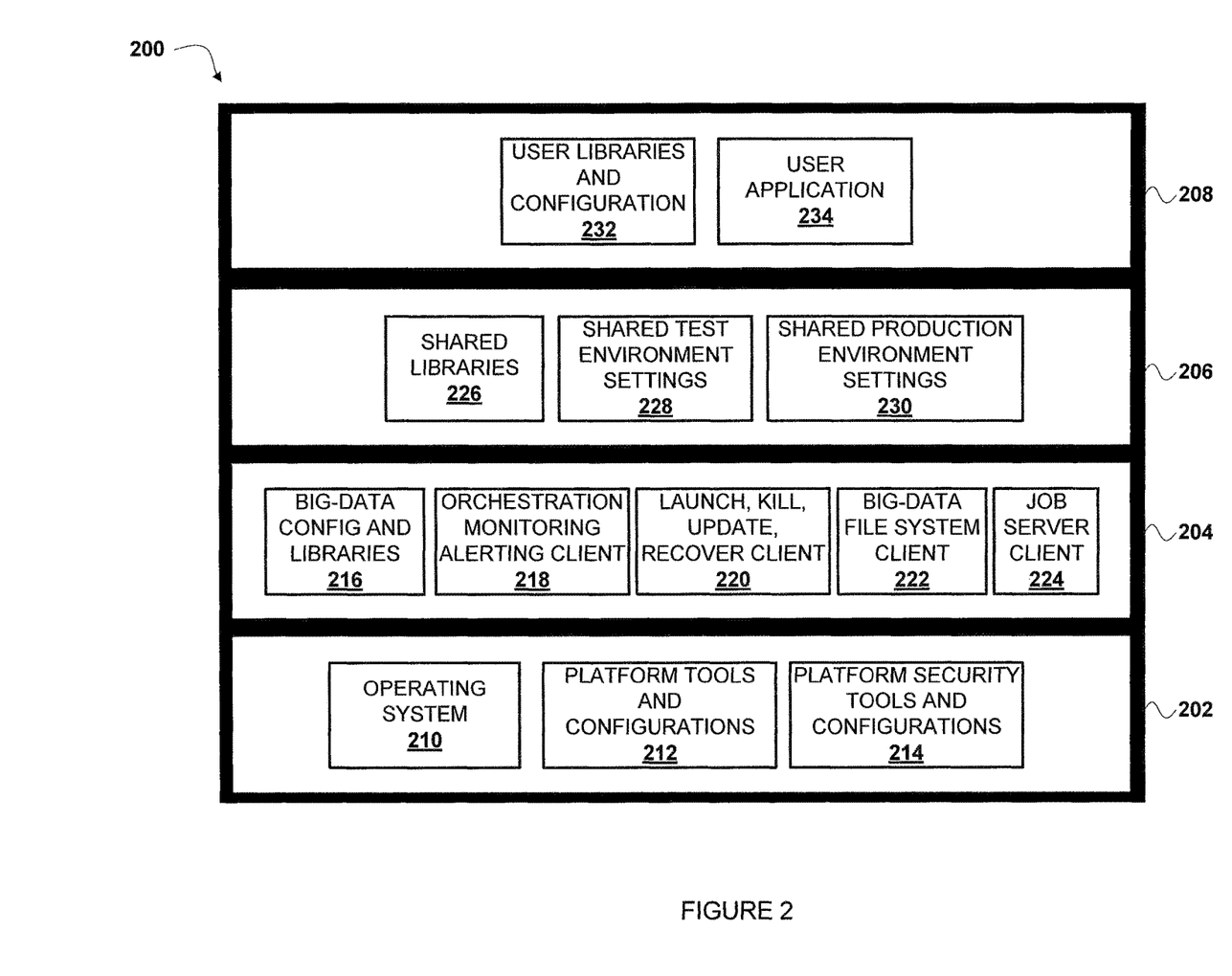
FIG. 2 illustrates a block diagram of an exemplary template structure according to one embodiment.

FIG. 2 illustrates an exemplary block diagram of a template container used by lifecycle management platform 102. Build environment 108 and/or lifecycle management platform 102 may generate and use a template file or a template 200 to organize and automate the big-data lifecycle management. Template 200 is a multi-layer container file that contains all or the majority of settings, tools, and utilities, to test, build, run, manage, and analyze a big-data application. Template 200 may include a four-level container file with a base layer 202, a big-data layer 204, a group layer 206, and an application layer 208.

An organization may have multiple development groups/teams. In some examples, different groups may contribute to and develop different layers of template 200. For example, base layer 202 may be developed by a base platform team and a security team. Big-data platform team and big-data teams may develop big-data layer 204. The developer may develop application layer 208. The developer may develop application layer 208 with a source code management team and a build and test team. The group that the developer is a member of may develop group layer 206. Overall template function may be overseen by an application lifecycle team, an application repository team, a container management team, a hardware provisioning team, and/or a support team.

In some examples, template 200 is a DOCKER image/container file. A DOCKER image is a file, which may include multiple layers, used to execute code in a DOCKER container. A DOCKER image is essentially built from the instructions for a complete and executable version of an application, which may rely on a host operating system (OS) kernel. In some examples, template 200 is a DOCKER image with a readable/writeable layer (for the big-data application) on top of one or more read-only layers. These layers (also called intermediate images) may be generated when the commands in the container/DOCKER file are executed during the container/DOCKER image build.

Base layer 202 may include settings, utilities, and tools used in the runtime environment, networking, and security for the application. Settings in base layer 202 may include settings applicable for big-data and non-big-data applications including the operating system 210 (e.g., a LINUX distribution, WINDOWS, APPLE OS etc.), platform tools and configurations 212 including low level network topological settings and sever cluster configurations and settings, and platform security tools and configurations 214. Security tools may include connections to secure keychain applications to provide access permissions to resources and to protect users and application credentials, passwords, and other secrets.

Big-data layer 204 may include features to access a big-data ecosystem (e.g., a HADOOP ecosystem) and upload dependencies to a big-data file system (e.g., HDFS). Big-data layer 204 may include big-data configuration and libraries 216 which may include information regarding how to connect to one or more big-data clusters 120 in either test environment 114 or production environment 116. An orchestration, monitoring, and alerting client 218 may be an interface configured to retrieve information from scheduling and management servers 118 to retrieve information regarding logging, monitoring, governance, access control, and alerting information. A launch, kill, update, and recover client 220 may be an interface configured to launch and manage a big-data application that is running on one or more big-data cluster 120. Big-data file system client 222 may include a HADOOP HDFS client. Big-data file system client 222 may include an interface to communicate with the big-data file system and perform file related tasks like reading and writing block data. A job server client 224 (e.g., an APACHE Livy client) may be used to interact with one or more scheduling and management server 118 to instruct or receive information regarding scheduling of jobs. Job server client 224 may include an API or REST interface.

Group layer 206 may include user specific features, where a user includes platform/development team/group specific features, that are specifically required or useful for a particular team. These features may include templates for runtime parameters and dependencies. A team/group includes a group of developers that create similar applications having the same end points or library dependencies. Group layer 206 may include shared libraries 226. Shared libraries 226 may include shared libraries that will be included in each application developed by the specific team. Group layer 206 may include shared test environment settings 228 and shared production environment settings 230 to interact with a big-data ecosystem (e.g., the HADOOP ecosystem) on a big-data server cluster 120 as a group may have one or more dedicated big-data server clusters 120 for testing or production.

Application layer 208 may include features required by the application such as application specific dependencies, tools, or utilities. This includes dependencies that are not typically found or used by the specific development team (which may be placed in group layer 206). Application layer 208 includes user libraries and configuration 232 which includes all code that the user application 234 depends on (to be built). A user application 234 may initially be a stub or template application. In some examples, user application 234 may be a team/group specific stub or template file. The template file may be buildable and able to be run in test environment 114 (or production environment 116).

Figure 3A:
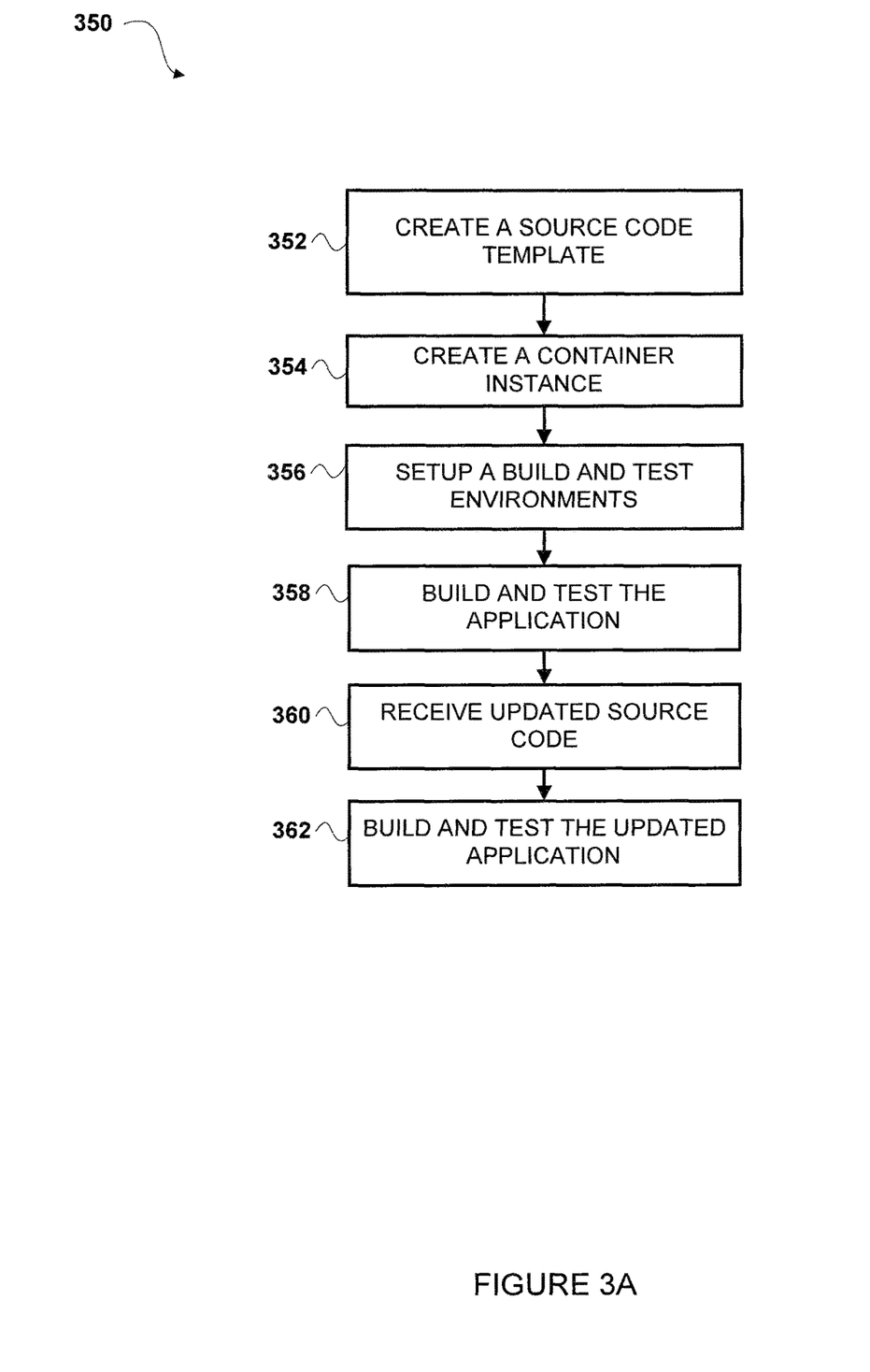
FIG. 3A illustrates a flowchart for performing big-data application lifecycle management according to one embodiment.

Referring now to FIG. 3A is a flow diagram 350 illustrating the use of system 100 to manage the lifecycle of a big-data application according to one embodiment. User device 104 may connect to lifecycle management platform 102 via network 106. Lifecycle management platform 102 may present a user interface to user device 104 to create a new big-data application. The user interface may request certain information in order to generate a new big-data application. In one example, lifecycle management platform 102 requests a team or development group of the big-data application to create the big-data application.

Lifecycle management platform 102 may create a source code template, at block 352. The source code template may be specific to a particular development or user group. In certain examples, the group may be specified by user input. In other embodiments, the group may be implied by a user's credentials connecting to the lifecycle management platform 102. Lifecycle management platform 102 may create a container instance, at block 354. The container instance may store the source code template.

Lifecycle management platform 102 may setup build environment 108 for building the lifecycle management application and test environment 114 to run the big-data application on big-data server cluster 120, at block 356. Scheduling and management server 118 may be configured by lifecycle management platform 102 to test the big-data application.

Lifecycle management platform 102 may instruct build environment 102 to build and test a stub application, at block 358. The stub application may include only the automatically generated files (based on, e.g., the source code template) and not any user modified or created files. In some examples, the build creates a self-contained container and/or a set of container compose files and may contain all the library dependencies to run the stub applications.

If the building and testing succeeds, the user may modify the big-data application via the source code template. Modification of the source code may occur using a code repository 110. When complete (or prior to completion to test the code), a user may commit or finalize the code. This procedure may trigger the source code and dependencies to be transferred to the lifecycle management platform 102, at block 360. In other examples, a user may manually provide the updated source code to the lifecycle management platform 102. The updated source code may be placed in the container instance by lifecycle management platform 102. Lifecycle management platform 102 may re-build and re-test the newly updated code/application, at block 362.

Figure 3B:
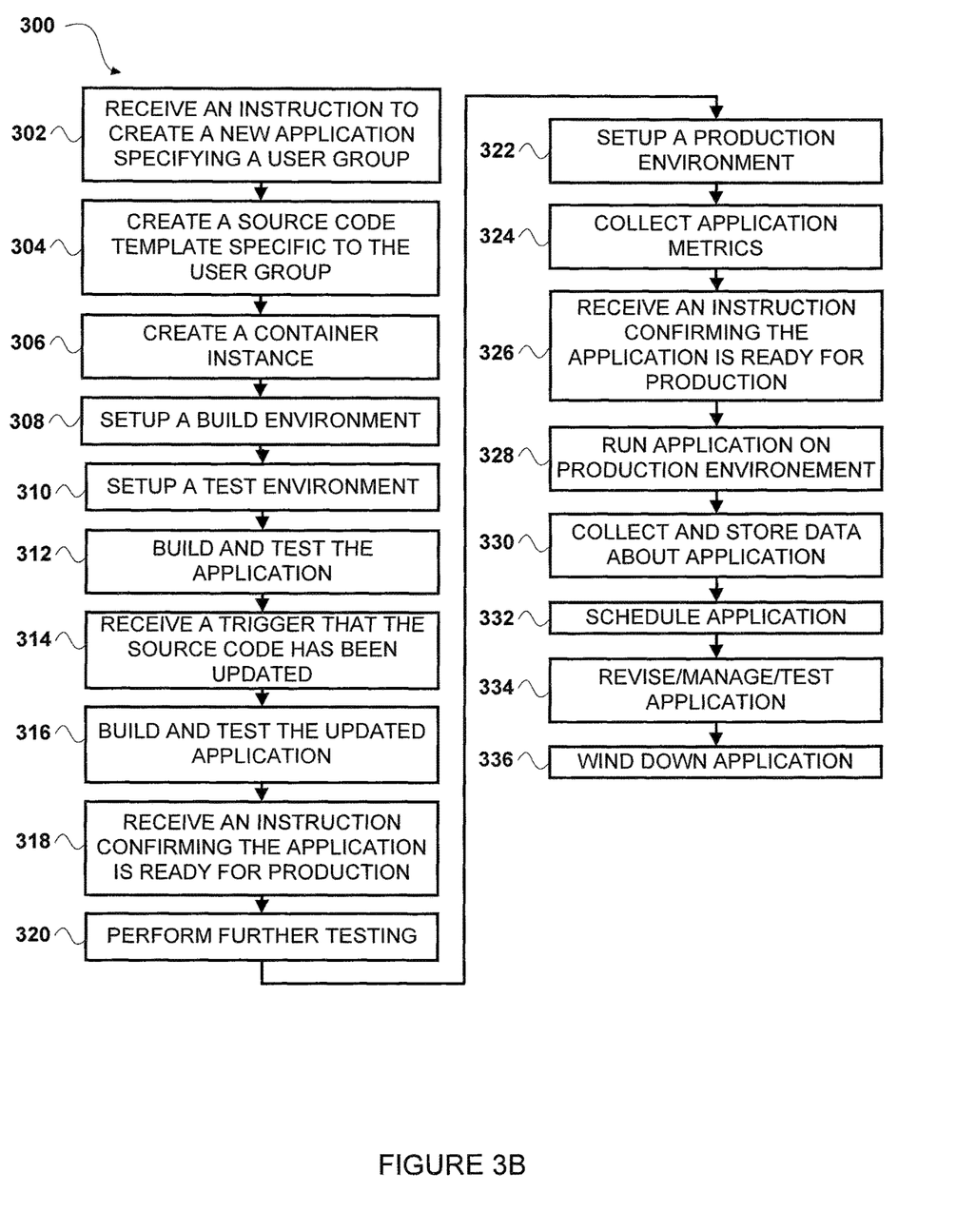
FIG. 3B illustrates a flowchart for performing]Jig-data application lifecycle management according to one embodiment.

Referring now to FIG. 3B is a flow diagram 300 illustrating the use of system 100 to manage the lifecycle of a big-data application according to one embodiment. User device 104 may connect to lifecycle management platform 102 via network 106. Lifecycle management platform 102 may present a user interface to user device 104 to create a new big-data application. The user interface may request certain information in order to generate a new big-data application. In one example, lifecycle management platform 102 requests a team or development group of the big-data application to create the big-data application.

Prior to using lifecycle management platform 102, users and groups may generate a template or stub application source code file and configuration files. The lifecycle management platform 102 may use these pre-generated application source code files and configuration files to generate a self-contained container file.

User device 104 may submit and lifecycle management platform 102 and receive an instruction to create anew application specifying a user group, at block 302. Lifecycle management platform 102 may create a source code template specific to the user group submitted, at block 304. Lifecycle management platform 102 may create a container instance (e.g., a DOCKERFile), at block 306. The container instance may store the source code template specific to the user group created at block 304.

Lifecycle management platform 102 may setup build environment 108 for building the lifecycle management application, at block 308. Lifecycle management platform 102 may setup a test environment at block 310 with the scheduling and management server 118 of test environment 114 to run the big-data application on big-data server cluster 120.

Lifecycle management platform 102 may instruct build environment 102 to build a stub application. In some examples, the build creates a self-contained container (e.g., a DOCKER image) and a set of container (e.g. DOCKER) compose files. In an example, self-contained means: the DOCKER image contains all or substantially all of the binary files required to run the application. In some examples, the binary files are java archive (jar) files. Further, the DOCKER image may contain all the library dependencies to run the applications. In some cases, library dependencies are managed by a dependency manager like MAVEN, SBT, and/or GRADEL. The DOCKER image may contain multiple sets of configurations to run the applications on four different environments. These environments may include a base/development environment, a quality assurance(QA) environment which may include user stages of a cloud platform such as the GOOGLE CLOUD platform (GCP), a sandbox environment (for third-party use), and production environments. Multiple combinations of environments and configurations may be used for the same application. For example, a single application may have one configuration set for the development environment, three configuration sets for QA environments, one configuration set for a sandbox environment, and five configuration sets for production environments.

The DOCKER image may contain scripts to connect to a keychain application to get the secrets/passwords required to run the application securely from the keychain application. The DOCKER image may contain scripts to put all the files required to run the application on the big-data file system (e.g. HDFS). The DOCKER image may contain scripts to submit a new job to a job assignment/scheduling (e:g. a Livy) server. The DOCKER image may contain scripts configured to check the status of a submitted big-data application/job (e.g. APACHE SPARK job) on a big-data cluster (e.g. APACHE HADOOP 'Yet Another Resource Negotiator' (YARN)) periodically to perform pull based scheduling and resource management. The DOCKER image may contain scripts to clean up the uploaded files into the big-data file system (e.g. HDFS) after the application ends (or fails).

The container (e.g., DOCKER) compose files may contain all the parameters that are needed to run the application in an environment and may make up the command that is executed when submitting a big-data application on a compute engine, e.g., the APACHE SPARK compute engine. Some of the parameters may be provided by the big-data lifecycle management platform and others may be defined by the application developer. In some examples the application developer may define and add their own parameters to their big-data application. Some of the following parameters may have the same value across all environments, but others may vary for each environment. These parameters may include: SPARK_USER, HDFS_SERVER_ADDR- ESS, WEBHDFS_SERVER_PORT, CLUSTER_ENV, AVAILABILITY_ZONE, APP_MAIN_CLASS, APP_MAIN_JAR, EXTRA_JARS, EXTRA_FILES, APP_NAME, VERSION, LIVY_SERVER, AUTHENTICATION_TYPE, and KEYCHAIN ENDPOINT.

Depending on the specific environment, one or more types of container-compose files, e.g. docker-compose files, may be generated for each environment or group of environments. For example, for base/development environments, a docker-compose-base.yml file may be generated; for QA/GCP user stages, a docker-compose-qa.yml file may be generated; for sandbox environments, a docker-compose-sandbox.yml file may be generated; and for production, a docker-compose-production.yml file may be generated. In one example, the big-data application lifecycle management platform may support as many environments as needed at any granularity level. These environments can be as fine-grained or as coarse-grained as needed. For example, a parameter can be configured for all test environments. Yet another parameter can be configured only for the production environment located in one city, e.g., Salt Lake City, or one region, e.g., Southwest United States, or one country, e.g., the United States. Naming of the compose files may be based on the environment that being configured.

The newly created container can be run in test environment 114 (which may include one of the test environments previously described), at block 312. Test environment 114 may be a separate management of the application and running the application on specific server clusters. The application may be run in a virtual machine or in a container in the test environment 114. Once the application has been fully built and tested, a user may update source code of the new application with new code written for this application to supplement or replace the application that was built and tested. New code may be sent to code repository 110. When a user commits the code in code repository 110, code repository 110 may send a trigger to lifecycle management platform 102. At block 314, the lifecycle management platform 102 may receive the trigger alerting that the source code has been updated. Lifecycle management platform 102 may rebuild and retest the application, at block 316.

When an application is complete, and has been tested, a user may instruct lifecycle management platform 102 that the application is ready to be placed in production, at block 318. A user may provide confirmation to indicate the application is ready for placement into production or the process may be automated. Lifecycle management platform 102 may perform additional testing (e.g., a security scan, resource usage testing) to determine whether the application is ready to be run in production environment 106, at block 320. Test environment 114 may be a separate management of the application and running the application on specific server clusters during the testing and/or during the full lifecycle of the application. Upon completion of the testing, lifecycle management platform 102 may setup a production environment (e.g., production environment 116) to run the application, at block 322. At block 324, metrics may be collected by lifecycle management platform 102 about the application (logs, monitoring) and then analyzed. Lifecycle management platform 102 may provide an automated approval of the application for use in production. The user may provide an instruction confirming the application is ready for production, at block 326. Following receipt of the instruction, lifecycle management platform 102 may run the application in production environment 116 at block 328. In certain embodiments, launching the application in the production environment includes staggering deployment of the big-data application into a plurality of big-data server clusters 120. For example, the application may be deployed in a first big-data server cluster at a first time, and if it is stable, deploying the application in a second big-data server cluster at a second later time.

While in the production environment, the application may be run. Data about the application, resource usage statistics, error logs, etc. may be collected and stored, at block 330. The application may be scheduled (by scheduling and management server 118) to run at a specific time, to be coordinated with one or more other application (e.g., if there are data dependencies between the applications), or to be run more or less frequently based on the data collected, stored, and analyzed, at block 332.

During the lifecycle of the application, the software may be revised, managed, tested, and updated, at block 334. Once the application is no longer useful, has been replaced by another application, or completed its set function, the application may be wound down, at block 336. This may include removal from the system, movement of the production data to a different location, or deletion. The present system may manage the lifecycle of a single application or may be used to manage the lifecycle of multiple applications in parallel. Therefore, multiple applications may be being built, in testing, or in production environments or a combination of the three.

Figure 4:
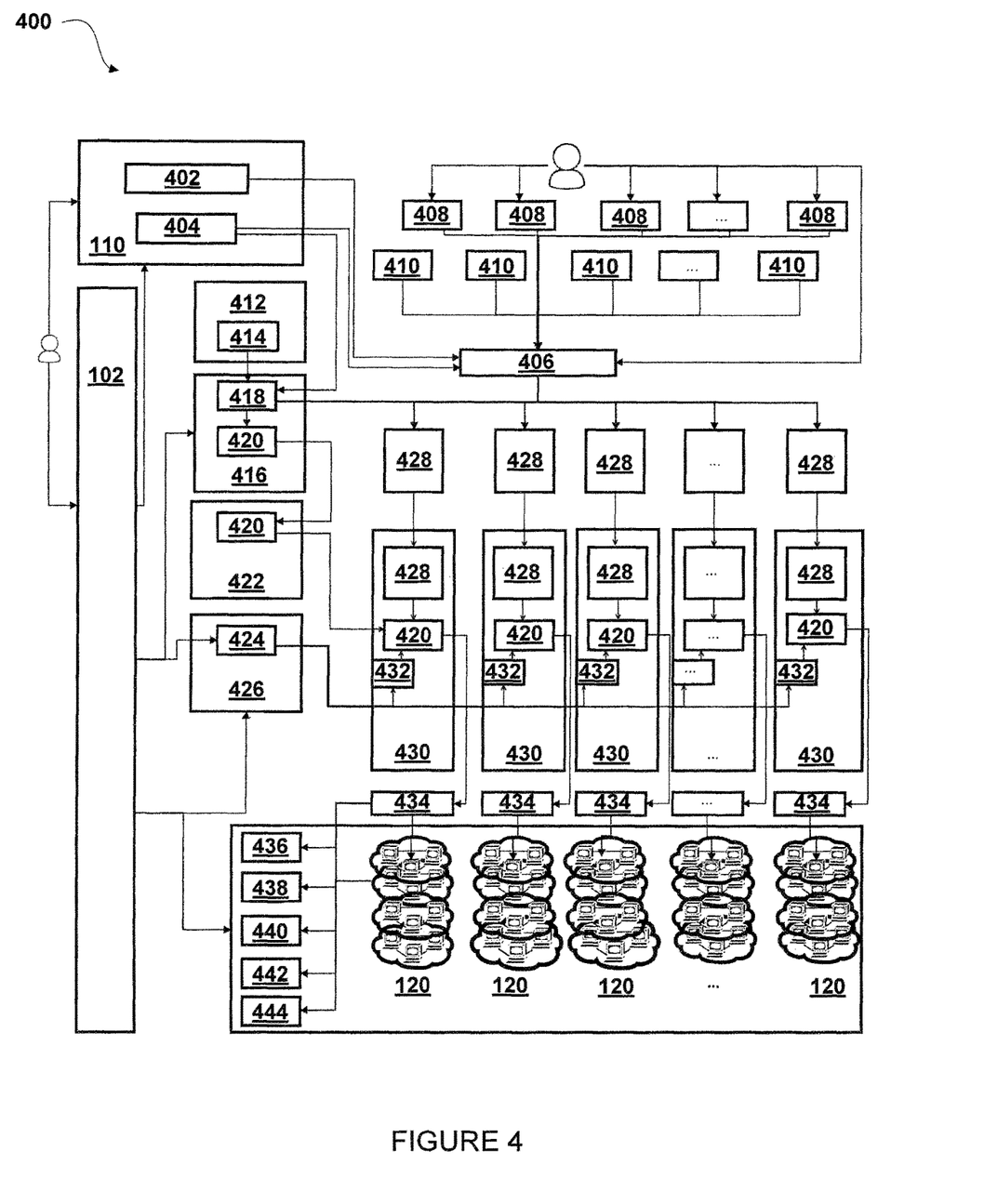
FIG. 4 illustrates a block diagram illustrating a big-data application lifecycle management system according to one embodiment.

Referring now to FIG. 4, a system 400 for performing lifecycle management of big-data applications is illustrated. Lifecycle management platform 102 may include an interface for a user device. An application developer may interact with lifecycle management platform 102 and code repository 110. In certain embodiments, code repository 110 may include user configurations 402 and an application source code 404 that are editable by the user.

A configuration preparer server 406 may receive user configurations 402 and application source code 404 from code repository 110 as well as environmental configurations 408 and environmental templates 410. Each of the configurations 408 and templates 410 may be designed to work with a particular big-data server cluster 120.

When a big-data application is built, library dependencies may be collected from a library repository 412. Application libraries 414 in library repository 412 may be combined and compiled with application source code 404 to build the big-data application. Application source code 404 and application libraries 414 are linked and/or compiled together to form an application binary 418 by an automated build environment server 416. Automated build environment server 416 may run an automated build application (e.g., JENKINS). Application binary 418 is placed into a template container image for the application 420. Other library dependencies and application configurations may be placed into the template container image for the application 420. Once the application binaries (as well as libraries and configurations) are placed into the template container image, the result is the container image of the application. The container image for the application 420 may then be moved to an artifact repository 422, which may include a DOCKERHUB or ARTIFACTORY server.

Application secrets 424 may include passwords, encryption keys, etc. and may be stored in a secure keychain 426. Secure keychain 426 may be used to launch the big-data application on server clusters 120. Container image 420 is sent to a job server 434 running a scheduler application (e.g., a LIVY server) which is configured to schedule the big-data application to run on the big-data server clusters 120. Job server 434 may be configured to schedule multiple applications and can be configured to schedule applications based on data dependencies between multiple applications. Job server 434 is also configured to track statistics and health information about the big-data server clusters 120 including logging 436, monitoring 438, governance 440, access control 442, and alerting 444. This information 436-444 is provided to lifecycle management platform 102.

Application binary 418 from the automated build environment server 416 and configuration and parameters to the application 428 (from configuration preparer server 406) may be transferred to cluster management system 430 running a big-data management application configured to manage computer clusters (e.g., APACHE MESOS). Cluster management system 430 may include an application launcher 432 configured to launch the template container image for the application 420.

Figure 5:
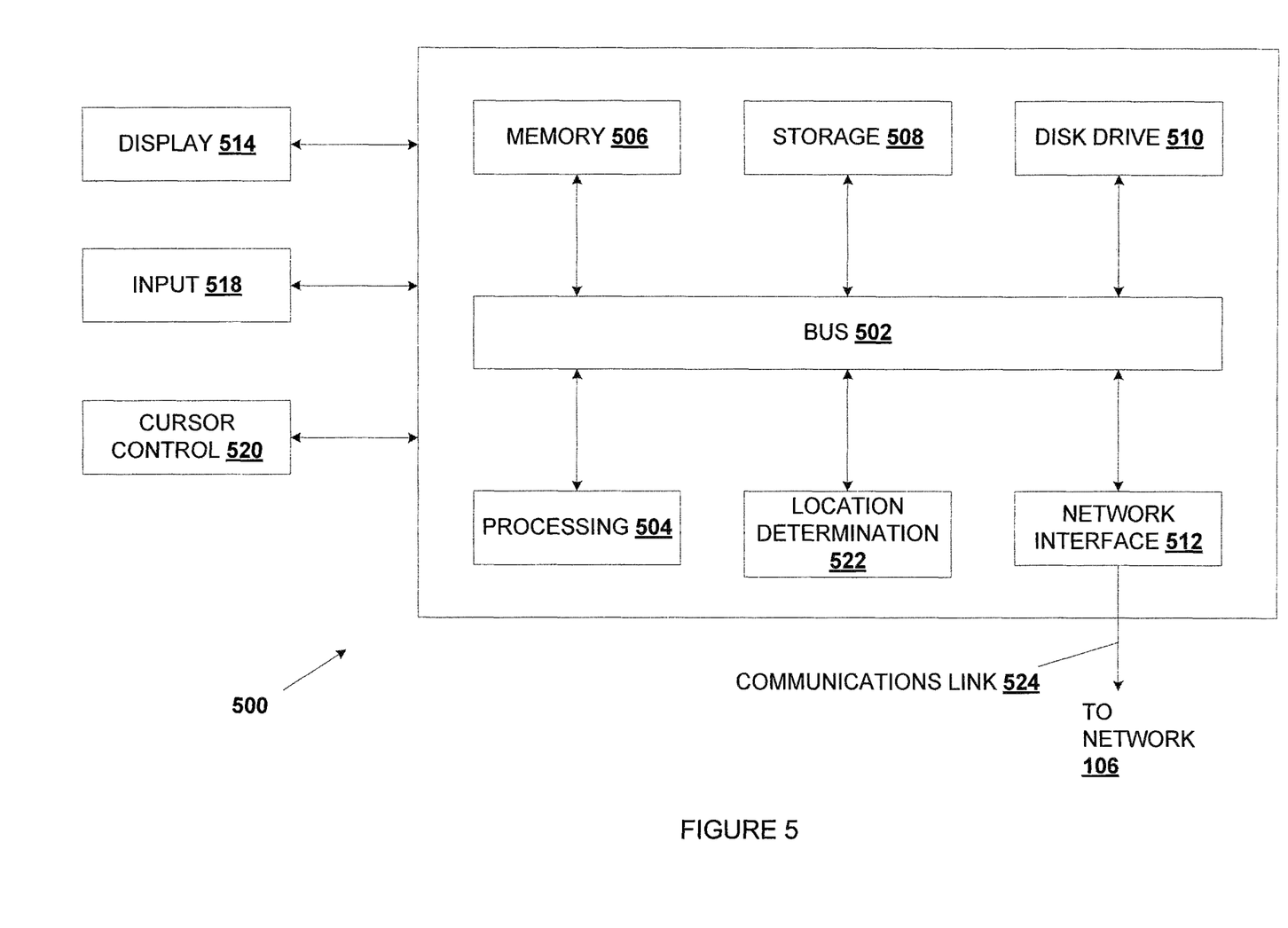
FIG. 5 illustrates an example block diagram of a computer system suitable for implementing one or more devices of the big-data application lifecycle management system of FIGS. 1-4 according to one embodiment.

Referring now to FIG. 5, an embodiment of a computer system 500 suitable for implementing, for example, the user devices, platforms, and servers (including server clusters when combined), is illustrated. It should be appreciated that other devices utilized in the application lifecycle management system may be implemented as the computer system 500 in a manner as follows.

In accordance with various embodiments of the present disclosure, computer system 500, such as a computer and/or a network server, includes a bus 502 or other communication mechanism for communicating information, which interconnects subsystems and components, such as a processor 504 (e.g., processor, micro-controller, digital signal processor (DSP), etc.), a system memory component 506 (e.g., RAM), a static storage component 508 (e.g., ROM), a disk drive component 510 (e.g., magnetic, optical, flash memory, or solid state), a network interface component 512 (e.g., modem or Ethernet card), a display component 514 (e.g., CRT or LCD), an input component 518 (e.g., keyboard, keypad, or virtual keyboard, microphone), a cursor control component 520 (e.g., mouse, pointer, or trackball), and/or a location determination component 522 (e.g., a Global Positioning System (GPS) device as illustrated, a cell tower triangulation device, and/or a variety of other location determination devices known in the art). In one implementation, the disk drive component 510 may comprise a database having one or more disk drive components.

In accordance with embodiments of the present disclosure, the computer system 500 performs specific operations by the processor 504 executing one or more sequences of instructions contained in the memory component 506, such as described herein with respec(to the user devices, server devices (including the payment provider server, merchant server, and authentication server), data stores, and nodes. Such instructions may be read into the system memory component 506 from another computer readable medium, such as the static storage component 508 or the disk drive component 510. In other embodiments, hard-wired circuitry may be used in place of or in combination with software instructions to implement the present disclosure.

Logic may be encoded in a computer readable medium, which may refer to any medium that participates in providing instructions to the processor 504 for execution. Such a medium may take many forms, including but not limited to, non-volatile media, volatile media, and transmission media. In one embodiment, the computer readable medium is non-transitory.

In various implementations, non-volatile media includes optical or magnetic disks, such as the disk drive component 510, volatile media includes dynamic memory, such as the system memory component 508, and transmission media includes coaxial cables, copper wire, and fiber optics, including wires that comprise the bus 502. In one example, transmission media may take the form of acoustic or light waves, such as those generated during radio wave and infrared data communications.

Some common forms of computer readable media includes, for example, floppy disk, flexible disk, hard disk, solid state drives (SSD), magnetic tape, any other magnetic medium, CD-ROM, any other optical medium, punch cards, paper tape, any other physical medium with patterns of holes, flash storage, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 500. In various other embodiments of the present disclosure, a plurality of the computer systems 500 coupled by a communication link 524 to the network 106 (e.g., such as a LAN, WLAN, PTSN, and/or various other wired or wireless networks, including telecommunications, mobile, and cellular phone networks) may perform instruction sequences to practice the present disclosure in coordination with one another.

Network interface 512 of computer system 500 may also include a short-range communications interface. Thus, network interface 512, in various embodiments, may include transceiver circuitry, an antenna, and/or waveguide. Network interface 512 may use one or more short-range wireless communication technologies, protocols, and/or standards (e.g., Wi-Fi, Bluetooth®, Bluetooth Low Energy (BLE), infrared, NFC, etc.).

Network interface 512, in various embodiments, may be configured to detect other systems, devices, peripherals, and data stores with short range communications technology near computer system 500. Network interface 512 may create a communication area for detecting other devices with short range communication capabilities. When other devices with short range communications capabilities are placed in the communication area of network interface 512, network interface 512 may detect the other devices and exchange data with the other devices. Network interface 512 may receive identifier data packets from the other devices when in sufficiently close proximity. The identifier data packets may include one or more identifiers, which may be operating system registry entries, cookies associated with an application, identifiers associated with hardware of the other device, and/or various other appropriate identifiers.

In some embodiments, network interface 512 may identify a local area network using a short-range communications protocol, such as Wi-Fi, and join the local area network. In some examples, computer system 500 may discover and/or communicate with other devices that are a part of the local area network using network interface 512.

The computer system 500 may transmit and receive messages, data, information and instructions, including one or more programs (i.e., application code) through the communication link 524 and the network interface component 512. The network interface component 512 may include an antenna, either separate or integrated, to enable transmission and reception via the communication link 524. Received program code may be executed by processor 504 as received and/or stored in disk drive component 510 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed:

1. A non-transitory machine-readable medium having stored thereon machine-readable instructions executable to cause a machine to perform operations comprising:
   receiving an indication to create a big-data application;
   in response to receiving the indication, generating an application instance using a container template, that comprises a multi-layer container configured to manage a lifecycle of the big-data application, wherein the multi-layer container comprises:
   a settings container layer comprising operating system settings and security settings;
   a libraries container layer comprising settings and libraries common to a plurality of big-data applications;
   a test container layer comprising user settings and a test application; and
   a source code container layer comprising big-data application source code and big-data application specific settings; and
   deploying the big-data application in a production environment.

2. The non-transitory machine-readable medium of claim 1, wherein the operations further comprise testing the application instance in a testing environment.

3. The non-transitory machine-readable medium of claim 1, wherein the settings container layer further comprises at least one of an operating system, a set of platform tools, or a set of platform security tools, and wherein the libraries container layer further comprises an orchestration monitoring client.

4. The non-transitory machine-readable medium of claim 1, wherein the operations further comprise generating a second application instance in response to receipt of a trigger indicating an application source code update.

5. The non-transitory machine-readable medium of claim 1, wherein the settings container layer further comprises a customized operating system configured with one or more specialized developer tools.

6. The non-transitory machine-readable medium of claim 1, wherein the operations further comprise testing the application instance in a test environment.

7. A system comprising:
   a non-transitory memory; and
   one or more hardware processors coupled to the non-transitory memory and configured to read instructions from the non-transitory memory to cause the system to perform operations comprising:
   receiving an indication to create a big-data application;
   generating an application instance using a container template that comprises a multi-layer container configured to manage a lifecycle of the bib-data application, wherein the multi-layer container comprises:
   a settings container layer comprising operating system settings and security settings;
   a libraries container layer comprising settings and libraries common to a plurality of bib-data applications;
   a test container layer comprising user settings and a test application; and
   a source code container layer comprising an application source code and bib-data application specific settings; and
   configuring an environment for the application instance.

8. The system of claim 7, wherein the operations further comprise testing the application instance in the environment.

9. The system of claim 7, wherein the operations further comprise generating a second application instance in response to receipt of a trigger indicating an application source code update.

10. The system of claim 9, wherein in generating the second application instance, a second application is re-tested in the environment.

11. The system of claim 7, wherein the operations further comprise: in response to configuring the environment for the application instance, deploying the big-data application into a production environment.

12. The system of claim 11, wherein the deploying the big-data application includes a stagger deployment.

13. The system of claim 7, wherein the operations further comprise executing the application instance on a production server cluster according to a predetermined schedule.

14. The system of claim 13, wherein the executing includes determining a schedule based on dependencies between two or more applications.

15. A method, comprising:
   receiving, by one or more hardware processors, an indication to create a big-data application;
   generating, by the one or more hardware processors, an application instance using a container template that comprises a multi-layer container configured to manage a lifecycle of the big-data application, wherein the multi-layer container comprises:
   a settings container layer comprising operating system settings and security settings;

a libraries container layer comprising settings and libraries common to a plurality of big-data applications;

a test container layer comprising user settings and a test application; and a source code container layer comprising an application source code and big-data application specific settings; and configuring, by the one or more hardware processors, an environment for the application instance.

16. The method of claim 15, further comprising testing the application instance in the environment.

17. The method of claim 15, further comprising generating a second application instance in response to receipt of a trigger indicating an application source code update.

18. The method of claim 17, wherein in generating the second application instance, a second big-data application is re-tested in the environment.

19. The method of claim 15, further comprising:

in response to configuring the environment for the application instance, deploying the big-data application into a production environment.

20. The method of claim 15, wherein the deploying the big-data application includes a stagger deployment in a virtual machine environment.

* * * * *

UNITED STATES PATENT AND TRADEMARK OFFICE
CERTIFICATE OF CORRECTION

PATENT NO. : 11,580,010 B2
APPLICATION NO. : 17/480506
DATED : February 14, 2023
INVENTOR(S) : Meisam Fathi Salmi et al.

It is certified that error appears in the above-identified patent and that said Letters Patent is hereby corrected as shown below:

In the Claims

Claim 7, Column 16, Line 22, change, "manage a lifecycle of the bib-data" to --manage a lifecycle of the big-data--.

Claim 7, Column 16, Line 27, change, "a plurality of bib-data" to --a plurality of big-data--.

Claim 7, Column 16, Line 32, change, "source code and bib-data application" to --source code and big-data application--.

Signed and Sealed this
Fourth Day of April, 2023

Katherine Kelly Vidal
*Director of the United States Patent and Trademark Office*